United States Patent [19]
Muraca

[11] 3,790,864
[45] Feb. 5, 1974

[54] ALKALINE ELECTROLYTES FOR CELLS WHICH PROVIDE EFFICIENT COULOMBIC STORAGE AND TRANSFER FUNCTIONS

[75] Inventor: Raffaele F. Muraca, Los Altos Hills, Calif.

[73] Assignee: Western Applied Research and Development, Inc., Menlo Park, Calif.

[22] Filed: July 24, 1969

[21] Appl. No.: 844,665

[52] U.S. Cl. .............................. 317/231, 252/62.2
[51] Int. Cl. ............................................. H01g 9/00
[58] Field of Search .......... 317/230, 231, 232, 233; 252/622

[56] References Cited
UNITED STATES PATENTS

| | | | |
|---|---|---|---|
| 1,628,785 | 5/1927 | Keeler | 317/233 |
| 2,111,993 | 4/1938 | Robinson | 317/230 |
| 3,222,654 | 12/1965 | Widrow et al. | 317/231 X |
| 3,302,091 | 1/1967 | Henderson | 320/48 |
| 3,538,396 | 11/1970 | Carson, Jr. et al. | 317/231 |

Primary Examiner—James D. Kallam

[57] ABSTRACT

There are disclosed compositions of alkaline electrolytes for use in electrolytic cells of the kind which are intended to provide accurate or reproducible coulombic storange and transfer functions. The electrolytes are free of dissolved oxygen and contain, among a variety of ionic species in solution, the complex-cyanide ions of only one reversibly electrodepositable and electrosoluble metal; they may also contain borate buffers. The initial dissolved-oxygen content of the electrolytes may be removed by an excess of alkali metal or alkaline earth sulfite; because excess sulfite acts as an oxygen scavenger, the electrolytes may be loaded into electrolytic cells in a normal air environment.

8 Claims, No Drawings

ALKALINE ELECTROLYTES FOR CELLS WHICH PROVIDE EFFICIENT COULOMBIC STORAGE AND TRANSFER FUNCTIONS

This invention relates to electrolytes which are used in electrolytic cells that are to provide accurate coulombic storage and transfer functions so that they can perform as timers or integrators; electrolytic cells of this type may also be used as memory devices in some forms of electrical machinery.

Passage of a current of electricity through electrolytic cells of the specific type indicated above results in the thermodynamically-reversible transfer of part, or all, of an electrochemically-active material of which an entire electrode structure may be fabricated or which may be initially on a conductive electrochemically-inactive electrode surface such as of platinum or gold, to a second electrode which as a conductive, electrochemically inactive surface; when the flow of current subsequently is such that said second conductive, electrochemically-inactive surface is the anode, said electrochemically-active material can be returned to the original electrode or to another conducting surface. For example, when said type of electrolytic cell is used as an integrator, the electrode initially bearing the electrochemically-active material is made anodic, a conductive, electrochemically-inactive electrode is made cathodic, and a stoichiometric amount of electrochemically-active material equivalent to the number of coulombs that flow during a "charge" cycle will be transferred from the anode to the cathode. When the polarity of the source of electrical energy is reversed, and an arrangement or device is employed so that constant current is caused to flow during the "discharge" cycle in which said accumulated electrochemically-active material is returned to the electrode from which it originally came, the electrodes are in a state of thermodynamic equilibrium because both electrodes are coated with electrochemically-active material, and the potential drop across the cell is thus typically very low. The potential drop across the cell rises abruptly when all active material has been removed from the anode and thus signals that all the active material which was on the anode has been dissolved. The signal also implies that the same number of coulombs used to transfer the active material during the charge cycle have now been passed through the electrolytic cell. The abrupt rise in potential drop across the cell occurs because the anodic electrochemically-inactive electrode-material can not be dissolved in the electrolyte, and the arrangement or device used to provide said constant current applies a higher potential in an effort to maintain current flow; if the applied potential is allowed to increase indiscriminately, the water in the electrolyte will be decomposed, but as a rule the potential is limited to a value generally, but not necessarily, less than about 1 volt.

A variety of arrangements and devices can be used to provide a flow of constant current to electrolytic cells, but the simplest arrangement consists of a battery with a voltage divider which selectively limits the voltage applied to the electrolytic cell to a value of 0.5 to about 1.0 volt and a resistor in series with the electrolytic cell, said resistor limiting the maximum current flow through the electrolytic cell to a desired value; the instant the anode is cleared of electrochemically-active material, essentially zero current flows through the electrolytic cell and the potential across the cell changes abruptly from a nominally low value of 20 to 75 millivolts to the full voltage of said divider. Those versed in the art readily recognize the operating principle involved in the aforementioned arrangement and that the required values of the individual resistors to provide essentially constant current to an electrochemical cell can be computed easily.

At this point it is necessary to indicate that although in this disclosure the reversible plating and deplating of a metal from one electrode to the other is described, for convenience, as if the very same metal removed from one electrode is transported across the intervening electrolyte to the other electrode, this is far from being correct. In electrolytic cells of the type under discussion metal is converted to metal ions at the anode and these ions tend to remain close by, and at the cathode metal ions from the adjacent electrolyte are plated out; thus, statements implying direct transport are merely conveniences for purposes of describing the present invention and in no way are to be construed as errors of concept, or as limitations of the scope of the present invention.

Accurate or reproducible coulombic storage and transfer functions can be achieved in an electrolytic cell only when electrically equivalent amounts of electrochemically-active materials can be transferred between electrodes and deposited thereon and the materials remain thereon while current is not flowing through the cell, for only in this way will a definite number of coulombs be fully represented by the active material transferred to and stored on a collector electrode. The stored electrical equivalents of electrochemically-active material become recognizable, upon reversal of current flow in an integrator cell, as the number of coulombs which need to be passed until the potential drop across the cell rises abruptly. If the initial transfer of electrochemically-active material is made by a varying current over a fixed interval of time, the active material that is transferred will correspond to a fixed number of coulombs, and when the active material is returned to the original electrode by a fixed current, the time required for transfer is directly related to the integral of the varying current.

On the other hand, if all electrochemically-active material initially on a conductive, electrochemically-inactive electrode surface is completely transferred at a constant current to another conductive, electrochemically-inactive electrode surface that is initially free of electrochemically-active material, and then returned to the original electrode at constant current, each transfer will require the same amount of time. Such a transfer of all active material from electrode to electrode at constant current thus involves sharply-defined time intervals, each signalled by an abrupt rise in potential drop across the electrolytic cell as explained hereinbefore. Thus, electrolytic cells with accurate coulombic storage and transfer capabilities can be used to provide repetitive timing signals, and as such it is evident that the electrolytic cells using the electrolytes to which this invention relates are not to be confused with coulometers, for said coulometers are intended to provide absolutely quantitative deposition of metal on a cathode, but the anode reaction need not be represented as a quantitative dissolution of metal.

Electrolytic cells capable of accurate coulombic storage and transfer functions may also be used as components to provide a pulse or signal at a given time after activation; closely-defined time intervals can be obtained by control of the amount of electrochemically-active material initially placed on an electrochemically-inactive electrode during manufacture and the close regulation of the current subsequently allowed to flow through the cell to dissolve the deliberately-placed electrochemically-active material. Electrolytic cells of this kind are thus often used in "one-shot" timing circuits where the abrupt rise in potential drop appearing across the cell as described hereinbefore can activate various devices such as fuses, explosive trains, projectiles, aerial bombs, missiles, satellites, sonobuoys, torpedoes, etc.

As has been implied by prior discussion, electrolytic cells which are capable of accurate coulombic storage and transfer are of great value for performing integrating and timing functions, as well as a variety of other important functions. However, state-of-the-art electrolytic cells, with state-of-the-art electrolytes, operated for the purpose of providing such functions have severe shortcomings which, in many instances, are often found to be due to a loss in the amount of electrochemically-active material that is transferred from electrode to electrode.

Loss of electrochemically-active material may occur physically, or mechanically; for example, electrochemically-active materials often drop away from electrodes because of poor adherence; such losses are usually attributable to improperly prepared electrode surfaces, but in electrolytic cells of the state of the art existing prior to the present disclosure, such losses are more often due to the prevalent use of acidic electrolytes, for these favor the undercutting of metal coatings and the spurious reactions which lead to the formation of loose films. Those versed in the art recognize that acidic solutions generally deposit crystalline, acicular, or dendritic structures which are poorly adherent; moreover, such deposits rarely dissolve uniformly, and fragments of metal thus drop away from anodic electrode surfaces. Losses can also occur if deposited metals are under strain, for when such deposits are dissolved anodically, small bits of metal are thrown off. But of even greater concern is the fact that electrolytes prepared according to the state of the art in existence prior to the present disclosure of invention cause loss of electrochemically-active material on storage because of side reactions which also lead to progressive losses of electrochemically-active material when electrolytic cells are cycled repetitively; such losses also occur in the one-shot electrolytic timing cells hereinbefore described, but the losses are to a large measure, but not reproducibly, compensated for during manufacture by small increments of active material in excess of the number of equivalents of active material that must be initially placed on one electrode; alternatively, the flow of current during the discharge cycle is set at an average value which compensates for losses and thus provides the required time interval.

Losses of metal during storage may also take place when metal deposits in electrolytes are exposed to light because of the occurrence of a variety of reactions; for example, the metal may be ionized and dissolved at the solution/metal interface, or a lower ionic valence state may be produced as, for instance copper(I) ions in a copper(II) electrolyte. However, most electrolytic cells are constructed in such a way that light can not enter.

In order for an electrolytic cell to function properly, the electrolyte must always remain in thermodynamic equilibrium with the electrochemically-active material on which operation of the cell is based, and it must remain essentially constant in composition over long periods of time as well as be so pure that the only electrode reactions which take place are those which are reproducibly associated with the thermodynamically reversible plating and deplating of the electrochemically active material. For example, if an electrolytic cell is based on plating and deplating of silver, the silver metal on the electrodes must be in true thermodynamic equilibrium with the ions in the electrolyte, and the metal must be capable of being plated or deplated with 100 percent efficiency, that is, one coulomb of electricity must always lead to plating or deplating of exactly its equivalent of metal; those versed in electrochemistry recognize that this can only occur when both the anode and cathode reactions are 100 percent efficient and thus must consist of single or consecutive reactions that are completely reversible, that competing reactions are either thermodynamically improbable or occur at voltages outside the operating range of the cell, and that only infinitesimal amounts of materials are transferred during plating and deplating. In a practical system, thermodynamic reversibility is difficult to achieve, especially since considerable amounts of material must be transferred during plating and deplating cycles; accordingly, one of the improvements sought by the present invention is a composition of electrolyte which more readily provides thermodynamic reversibility in a practical electrolytic cell.

The results of investigations performed with electrolytic cells of the general type noted hereinbefore suggest that plating and deplating of metals can be made to occur with high efficiency in properly constructed cells containing appropriate electrolytes; the results have also indicated that the observed shortening of the time period of a cycling electrolytic cell is due to nondescript side reactions occurring concurrently with the plating and deplating of metal, and especially to reactions which take place when the potential drop across the cell increases just before or after all metal has been deplated from one electrode or whenever there is an unequal distribution of electrochemically-active material on an electrode operated at essentially constant current as described hereinbefore. Accordingly, one of the improvements sought by the present invention is the minimization of the spurious reactions which render impossible the attainment of accurate or reproducible coulombic storage functions in electrolytic cells.

State-of-the-art electrolytes used in electrolytic cells intended to provide accurate or reproducible coulombic storage functions are composed of acidic media containing electrodepositable and electrosoluble metal ions; thus, metal salts of copper and silver in solutions of inorganic acids are frequently employed because a single cationic species is thermodynamically favored in acidic solutions, $Cu^{+2}$ for copper and $Ag^+$ for silver, and because ions of other states of oxidation are not readily formed at the low potentials employed in the operation of the electrolytic cells. On the other hand, ions of higher or lower oxidation states can be formed if electrolytes and electrolysis conditions are not appropriately selected, and their formation will lead to inaccuracy of the coulombic storage functions.

When copper is used as the electrochemically-active material, the acidic electrolyte may consist of copper(II) sulfate ($CuSO_4$) in a solution of sulfuric acid ($H_2SO_4$), but other combinations of copper(II) salts and the acids corresponding to their anions may be used, for example, copper(II) perchlorate and perchloric acid, and copper(II) phosphate and phosphoric acid; electrolytes containing high concentrations of phosphoric acid or perchloric acid are especially useful because they have low freezing points and can be operated over a wide temperature range, typically between $-50°$ and $70°C$. When silver is the basis metal, characteristic electrolytes consist of solutions of silver phosphate in phosphoric acid or silver perchlorate in perchloric acid.

Electrolytes prepared according to the state of the art existing prior to the present disclosure of invention invariably contain various amounts of dissolved oxygen and interfering, albeit small, amounts of organic as well as inorganic materials. Dissolved oxygen, even at very low concentrations, can cause dissolution of freshly deposited copper and silver; thus when electrolytic cells containing such electrolytes are used as integrators, electrochemically-equivalent amounts of the metals might be transferred between electrodes, but the deposited metals will be dissolved in amounts determined by such factors as the amount of oxygen in the cell, the rate of its diffusion to the newly deposited metal, and the intervening time between transfer of the metals between electrodes.

Hydrogen peroxide also may be present in electrolytes when prepared according to the state of the art existing prior to the present disclosure of invention, but it more frequently is formed in electrolytes by reduction of dissolved oxygen at a cathode, and its formation is a source of an apparent loss of metals such as silver or copper in electrolytic cells. Thus, when electrodes are maintained cathodic by as low as a few tenths of a volt, dissolved oxygen may be converted to a film of hydrogen peroxide which in turn may react with metal and cause its dissolution during the interval when the electrode is allowed to go to zero potential and then is made anodic, such as occurs typically when an electrolytic cell is cycled to provide a sequence of timing pulses.

Dissolved oxygen is preferentially reduced to hydrogen peroxide before copper and silver ions except when it is present in vanishingly small concentrations, and thus, before metal is deposited on a cathode, the initial flow of current reduces oxygen in the vicinity of the cathode, and the net result is that the metal deposited on the cathode can not represent the coulombs passed through the cell. Sequentially, the hydrogen peroxide formed from oxygen can be oxidized back to oxygen at the surface of an anode of a conducting, electrochemically-inactive material concurrently or after electrochemically-active material such as metal has been removed; however, formation of oxygen from hydrogen peroxide can take place only when the applied potential exceeds the thermodynamic reversible potential by an amount equal to the oxygen overvoltage, for the reaction involves release of gaseous oxygen at the conductive, electrochemically-inactive anode surface. The oxygen overvoltage on electrochemically-active metals such as copper and silver is very nearly the same as for a conductive, electrochemically-inactive surface such as smooth platinum or gold, and generally is at least 0.4 volt, but since the actual value of the oxygen overvoltage depends on the condition of the electrode surface and current density, it is evident that overvoltage values are sharply susceptible to changes during the life of an electrolytic cell.

Hydrogen peroxide is not oxidized as long as conductive, electrochemically-inactive anode surfaces exhibit high oxygen overvoltages; thus, the presence of dissolved oxygen in the electrolyte of an electrolytic cell is usually detected by a slight initial "loss" of metal owing to formation of hydrogen peroxide, and in an electrolytic cell operated so that all metal is alternately transferred from one electrochemically-inert electrode surface to another, the time required to transfer metal at constant current will slowly decrease for the first few cycles and then become constant. However, when the overvoltage of oxygen on electrode surfaces is destroyed by the catalytic effect of organic substances and other trace impurities, oxygen is regenerated whenever the anode potential can rise over the very low potential required to transfer metal from one electrode to the other; the anode potential must rise in order to have the electrolytic cell deliver a recognizable and useful signal for timing purposes, as has been described hereinbefore and, as a result, there is a progressive loss of metal attending each transfer, and the time period of a cycling electrolytic cell rapidly dwindles, and eventually all metal disappears. As will be made evident hereinafter, the present invention utilizes compositions of electrolytes which are inherently free of dissolved oxygen and which provide plating and deplating reactions that are highly efficient.

An electrolytic cell of the type described hereinbefore as being useful for performing timing and integrating functions is to provide an abrupt rise in the potential drop across a pair of electrodes when all electrochemically-active material has been removed from one electrode of the pair; ideally, the potential drop should change instantaneously, like the rising front of a square wave, but a slight slope in the rising front is always observed in the electrolytic cell action along with a small amount of deviation or curvature at the beginning and end of the abrupt rise. For practical purposes, electrolytic cells must supply abrupt changes of the order of 0.2 to 0.5 volt in order to function like switches, but when the electrochemically-active material is not distributed uniformly over electrodes, an acceptable wave form can not be achieved; the shape of the resulting wave is greatly influenced by the cell design and its mode of operation, as well as by agitation of electrolytes. Large deviations from an acceptable wave form are nevertheless observable even when uniform plating and deplating of electrochemically-active material occurs; some of these deviations have been found to be due to the presence of impurities in the electrolytes of electrolytic cells, and it appears that these deviations occur because the impurities are reduced or oxidized slowly on electrode surfaces or because they distort overvoltages as well as equilibria at electrode interfaces. Organic impurities in the materials used to manufacture acidic electrolytes are slowly oxidized or reduced in electrolytic cells, and in other ways prevent the occurrence of an abrupt change between the low and high potential drop across the cell.

Certain inorganic substances have also been found to affect the performance of electrolytic cells, and chlorides are among the most frequently encountered impurities which interfere. Once an electrode surface is "poisoned" by chloride ion, the desired abrupt rise in potential drop across the cell often can not be obtained; since many inorganic materials have been found to act as catalysts, and traces of platinum salts seem to deposit a catalytically active film of metal on electrodes which seriously degrades oxygen overvoltages, it is possible that the action of chlorides noted above may involve attack of electrodes with subsequent deposition of a film of a metal catalyst.

When an electrochemically-inert electrode surface, such as platinum, is made anodic and the counterelectrode is coated with a metal like copper or silver in an aqueous electrolyte containing copper or silver ions, current will not flow at applied potentials of less than the decomposition potential of the water in the electrolyte, about 1.4 volts, provided the overvoltage of oxygen on platinum remains high. If the anode can not exhibit a high value of overvoltage, oxygen is liberated at a potential lower than 1.4 volts, and the oxygen dissolves in the electrolyte and diffuses toward the cathode where it is reduced to hydrogen peroxide; when the flow of current is reversed, the hydrogen peroxide that has accumulated in the electrolyte surrounding the electrode is oxidized preferentially. It is emphasized that the exact mode in which impurities are involved with electrode or electrolytic phenomena may not be known exactly, but it has been found that electrolytes perform satisfactorily when prepared in ways which are known to eliminate all organic as well as some inorganic impurities and dissolved oxygen.

The effect on electrolytes of dissolved oxygen and interfering organic or inorganic impurities becomes readily apparent when plots of time versus the potential drop across a cycling electrolytic cell loaded with electrolytes prepared according to the state of the art prior to this invention disclosure are compared with plots obtained when the cell is loaded with electrolytes prepared as will be indicated hereinafter. The hereinbefore-described transition between low and high potential drop across the electrolytic cell will be found to be much sharper with electrolytes described by the present invention, especially if the cell is cycled numerous times.

It is emphasized in particular that the effect of dissolved oxygen and small amounts of organic matter and certain inorganic substances on the performance of the electrolytes to which this invention relates has eluded prior workers. Accordingly, still another improvement sought by the present invention is the preparation of an electrolyte which provides conditions for the exhibition of the maximum sharpness of transition between the low potential drop across an electrolytic cell when both electrodes are coated with an electrochemically-active material and the high potential drop when the anode bears no electrochemically-active material.

Those versed in the art of electroplating recognize that many metals, and especially copper and silver, when deposited from alkaline cyanide solutions are smooth, finely crystalline, and exceptionally adherent to clean metal substrates and hence would make excellent electrolytes for cells of the type discussed hereinbefore. However, state-of-the-art cyanide baths for electrodepositing copper and silver have compositions which are selected to provide maximum throwing power and lustrous deposits at the highest possible current densities, and to yield reproducible deposits over long periods of time; these electrolytes have been found to be totally unacceptable for use in electrolytic cells of the type which are to provide accurate coulombic storage and transfer functions, largely because spurious electrolytic reactions prevent the reversible deposition of amounts of metal absolutely equivalent to the number of coulombs passed through the cells. More often, however, the usual plating baths were found to be valueless as electrolytes because in electrolytic cells they fail to produce the abrupt changes in potential drops noted hereinbefore as being exceptionally desirable. The additives which are used in commercial cyanide baths for increasing the luster of deposits of the copper, silver, and other metals are especially undesirable, for they in particular prevent the abrupt rise in potential drop described hereinbefore and, moreover, they are often responsible for an abnormally high current flow at potentials less than the decomposition potential of the electrolyte for deposition of the electrochemically-active material on which the electrolyte is based, especially when one electrode (the anode) has no electrochemically-active material on it. As has been implied hereinbefore, the abruptness of the change in potential drop across an electrolytic cell of the type under discussion, the decomposition potential of the electrolyte, and the resistance to current flow at voltages less than the decomposition potential are extremely sensitive to the presence of small amounts of electrochemically-active substances; in fact, if an electrolytic cell is manufactured with an insert of silver, copper, or other metals deposited from a bath containing brighteners or other organic additives, the cell's performance characteristics often will betray the fact, because most additives tend to be codeposited or in other ways entrapped in metal deposits and thus are introduced into the electrolytic cell.

It has been found that the electrolytic cells required to provide accurate or reproducible coulombic storage functions can be operated with properly formulated alkaline electrolytes in which vanishingly small concentrations of ions of an electrochemically-active material, such as a metal, exist as the result of dissociations of a series of cyanide complexes in equilibrium with each other, and the electrochemically active material is the central atom in the complex corresponding to a normal metal cyanide of the general formula $Me(CN)_y$, where Me is the metal ion of valence $y$, dissolved in an aqueous solution of an alkali metal or alkaline earth cyanide of the general formula $A(CN)_n$, where A is the alkali metal or alkaline earth ion of valence $n$; the cyanide complex in the electrolyte thus corresponds to the general formula $A_xMe_z(CN)_{nx + zy}$, where $x$ is the number of moles of the alkali metal or alkaline earth cyanide and $z$ is the number of moles of the normal metal cyanide in the electrolyte. The central metal ion in the general formula may be copper, silver, cadmium, zinc, or indium, but the complex cyanides of metals such as iron must be rigorously excluded from electrolytes of the type to which this invention relates because they are oxidized or reduced without deposition of electrochemically-active material on electrodes, and thus they lead to loss of coulombic storage efficiency, or loss of metal as described hereinbefore.

The ratio of moles of alkali metal or alkaline earth cyanide to moles of normal metal cyanide in the aforementioned general formula is obviously X:Z, that is, the metal cyanide complex compositions in equilibrium with each other can also be expressed in summary as X [A(CN)$_n$]· Z[Me(CN)$_y$] and, in fact, the electrolytes can be quite readily prepared by appropriate mixing of X moles of A(CN)$_n$ with Z moles of Me(CN)$_y$. For example, when the electrochemically-active material is silver, its normal cyanide is AgCN, and if X=Z, the complex potassium salt in solution may be summarized by the formula KAg(CN)$_2$, or potassium cyanoargentate(I), and can be prepared by dissolution of AgCN in KCN. It has been found that electrolytes containing only this compound as the electro-active component form precipitates at an anode coated with silver, for when silver ions are released, there is formed silver argentocyanide, Ag(Ag(CN)$_2$), that is, silver cyanoargentate(I), or its equivalent, silver cyanide, AgCN, in accordance with the following equations:

$$KAg(CN)_2 \rightleftharpoons K^+ + Ag(CN)_2^-$$

presence of a precipitate on an electrode or in the immediate vicinity of an electrode is indicated by, or results in, an abnormal potential drop at the solution-electrode interface, especially when nearly all electrochemically-active material has been removed from one electrode in the operation of an electrolytic cell as an integrator or timer; the potential drop across the electrodes of an electrolytic cell will reflect said abnormal potential drop. However, it has been found that increased concentrations of potassium cyanide minimize the tendency of electrolytes to precipitate silver cyanide, and when the complex salt composition nearly corresponds to K$_2$Ag(CN)$_3$, that is, X=2Z in the general formula given hereinbefore, precipitation does not occur at room temperatures, and at appropriate current densities the plot of cell potential versus time exhibits the characteristic desirable abrupt change described hereinbefore. However, when the electrolyte containing K$_2$Ag(CN)$_3$ is operated at high current densities, the deposited silver is discolored and the transfer of metal is not quantitatively related to the number of coulombs passed through a cell.

Electrolytes containing alkali metal cyanocuprate(I) complexes behave like the cyanoargentate(I) complexes, that is, when X=Z, precipitation occurs at the anode, and when X=2Z, that is, the salt in the electrolyte corresponds substantially to the formula A$_2$Cu(CN)$_3$, where A is an alkali metal or the equivalent amount of an alkaline earth metal, the potential-time curve of a discharging electrolytic cell integrator shows desirable characteristics.

When X is slightly greater than 2Z, electrolytes containing copper(I) and silver(I) cyanide complexes still function adequately, but as X approaches 3Z, there is an increased tendency for dissolution of metal deposits, especially at pH values between 7 and 9 where the activity of the cyanide ion content of the electrolyte becomes high. Alternatively, it may be equivalently stated that low values of pH lead to such high concentrations of cyanide ions that the solution tendency of a metal such as copper or silver is increased to the point where the metal dissolves in the electrolyte, often with the evolution of hydrogen. At high current densities, where the deposition of metal at a cathode is altogether too rapid, there will be localized concentrations of cyanide ion liberated from the decomposed complex. In a cycling electrolytic cell, during the interval between switching of polarity, the localized cyanide ion concentration attacks the metal deposit and dissolves a small amount of it before the electrode bearing the deposit can be made anodic. Thus, there can be incurred a loss of coulombic storage efficiency. It is necessary to operate cyanide-containing electrolytes of the kind to which this invention relates at relatively uniform current densities which are appropriately selected by trial and error for each cell configuration, temperature, etc.

Ordinarily, it is assumed that the cyanide content which is "free" to bind dissolved metal ions and prevent formation of precipitates is the cyanide ion in excess of the amount required to form a stable complex, say K$_2$Cu(CN)$_3$, and most analytical procedures for free cyanide, as those versed in the art of electroplating recognize, are based on the determination of the cyanide content in excess of the "normal" complex cyanide. However, in the immediately preceding paragraph it was implied that the activity of the cyanide ion in an electrolyte may be considerably higher than the free cyanide content as determined by ordinary analysis, for the definition of free cyanide implies the equivalent amount of alkali cyanide in excess of the normal complex cyanide, that is, for copper it is K$_2$Cu(CN)$_3$ and for silver it is KAg(CN)$_2$, and for these cyanide complexes it is determined directly, as is known to those versed in the art, by an argentimetric titration to a turbidimetric endpoint of the electrolyte in an ammoniacal medium containing potassium iodide. The "free" cyanide content of other cyanide-containing electrolytes must be computed from the results of an analysis for the metal content and the total cyanide content. The state of the art of measuring activities of ions is changing rapidly, and in the near future it is anticipated that it will be possible to measure the activity of cyanide ions as readily as it is now possible to determine hydrogen ion activities with glass electrodes and electrometers. However, until that time, it will be necessary to define free cyanide by titrimetric procedures and then to establish cyanide ion activities by stating both the pH of electrolytes and their compositions, for it should be evident to those versed in chemistry that, in a given electrolyte, the cyanide ion concentration and its activity is governed principally by factors such as ionic strengths, pH, and the concentration of metal ions capable of forming cyanide complexes. No matter how complex the problem, however, once electrolyte composition and pH are defined, performance can be reproduced.

As has been indicated hereinbefore, the pH of cyanide electrolytes has been found to be of extreme importance and, typically, a pH between 9 and 10, as measured electrometrically with a glass electrode giving low or compensatable error for sodium or potassium ions in solution, has been found effective but other values of pH may be deemed satisfactory. Moreover, the addition of buffer salts such as alkali borates have also been found useful to prevent spurious reactions from occurring at electrode interfaces, especially at high current densities. A typical spurious reaction in cyanide media is the anodic oxidation of cyanide ion to cyanate; the formation of cyanate in an improperly constituted electrolyte is readily discerned as a flow of current after metal has been deplated from an anode in the potential-time plot of a "discharging" electrolytic cell integrator, obtained as indicated hereinbefore.

The presence of dissolved oxygen in cyanide electrolytes causes distortion of potential-time curves and loss of metal much as it does in acidic electrolytes; however, it seems that losses due to oxygen occur more readily in alkaline than in acidic electrolytes, perhaps because an alkaline medium induces the formation of peroxide or stabilizes it. For reasons stated hereinbefore, dissolved oxygen must be absent in electrolytes; it can be removed from cyanide-containing electrolytes by a stream of oxygen-free inert gas and kept out of electrolytic cells by taking suitable precautions during their manufacture, but it has been found that the concentration of dissolved oxygen in cyanide-containing electrolytes as well as in other types of alkaline electrolytes can be reduced essentially to zero by introduction of an alkali metal or alkaline-earth sulfite; all desirable characteristics of the electrolyte are maintained in the presence of sulfite. Moreover, an excess of sulfite in the electrolyte acts as a scavenger for dissolved oxygen during the manufacture of electrolytic cells.

It is emphasized that the discovery that sulfites can be added to metal-cyanide electrolytes as well as to other types of alkaline electrolytes that are to provide accurate coulombic storage and transfer functions in electrolytic cells without degrading their electrochemical efficiency in any way is of singular importance, for it permits the assembly of electrolytic cells in room atmosphere; moreover, if a small quantity of air were to be trapped in an electrolytic cell during manufacture, the excess sulfite will remove its oxygen content as well as the dissolved oxygen in the electrolyte.

It has been indicated hereinbefore that the electrolytes to be used with electrolytic cells that are to provide accurate coulombic storage and transfer functions must be free of certain organic and inorganic impurities in order to operate appropriately. To minimize the introduction of impurities, adequately prepared, and preferably triply-distilled water, must be used to form the electrolytes to which this disclosure relates. Ordinary "distilled" water, and particularly distilled water prepared by passage of tap water or even pure water through beds of ion-exchange resins, usually contains sufficient organic matter to affect the performance of electrolytes.

In the preparation of triply-distilled water, the second distillation is preferably made with permanganate in the boiler, and the last distillation is preferably carried out in quartz apparatus, at a slow rate so as to minimize carry-over, and in a stream of oxygen-free nitrogen or inert gas, and the distillate preferably should flow hot from the condenser and be used immediately. If the water is still suspect, it may be purified by electrolyzing it at least 24 hours between platinized platinum electrodes at a current density of the order of 5 milliamperes per square centimeter.

The preparation of the electrolytes to which this disclosure relates requires the use of chemical compounds of exceptional purity. Thus, for example, alkali metal or alkaline earth cyanides used to prepare the electrolytes must be low in iron compounds, as explained hereinbefore, because ferrocyanides and ferricyanides undergo red-ox reactions which do not form deposits on electrodes and, thus, when present in electrolytes, electrolytic cells can not perform in a way which provides that the coulombs passed through are represented by their electrochemical equivalent in metal deposit on an electrode. The alkali metal and alkaline earth cyanides must also be low in carbonate because carbonate ions have been found to interfere with the exhibition of the abrupt change in potential drop hereinbefore described as being extremely desirable; similarly, said cyanides preferably should be free of chloride ion because under certain conditions it may interfere with the efficiency of deposition of metals or reduce overvoltages, and cyanate ion also must be absent because it is readily electroreducible and quite completely destroys any resemblance to the square-wave symmetry desirable in the aforementioned plot of potential drop versus time in the operation of an electrolytic cell.

The presence of organic matter in alkali metal and alkaline earth cyanides may cause problems, for many organic materials are electrochemically-active or, more often, in devious ways destroy the high oxygen overvoltage exhibited by conductive, electrochemically-inactive surfaces. Recrystallization often removes organic matter, but persistent organic impurities that may be present in alkali metal or alkaline earth cyanides must be deactivated or destroyed by melting the cyanides and maintaining them at temperatures over their melting points while in an atmosphere of an absolutely dry and oxygen-free inert gas; since the alkali metal and alkaline earth cyanides fuse at high temperatures, organic compounds are carbonized and thus rendered inactive. The fused cyanides, when cool, are dissolved in triply-distilled water and then recrystallized several times under conditions which rigidly exclude contact with organic matter, such as plastic containers, and which insure that a clean and inert atmosphere surrounds the operations.

Most metal cyanides, $Me(CN)_y$, are commercially available in good purity, but very often they have not been prepared properly and, thus, contain inorganic as well as organic substances. Inorganic impurities are not easily removed; hence, it is appropriate to seek pure metal cyanides or prepare them. Small amounts of organic substances may be deactivated by carbonization at temperatures in excess of the melting points of metal cyanides while they are in a stream of dry, oxygen-free nitrogen.

Metal oxides may also be used to prepare electrolytes of the type to which this disclosure relates. If commercially-available oxides are suspected of containing inorganic impurities, they may be synthesized from the pure metal and oxygen. Alternatively, pure metal salts are converted to pure hydroxides or carbonates and then heated to form oxides. Commercially-available oxides are frequently quite free of interfering inorganic materials, but they are often contaminated with small amounts of organic dusts or bits of polymers; organic matter is destroyed by heating the oxides, whenever feasible, to temperatures below fusion, but over 400°C, in a stream of oxygen.

The following example, as an embodiment of the present invention, illustrates the general procedure for formation of cyanide electrolytes from metal cyanides and alkali metal or alkaline earth cyanides, and the procedure for deoxygenating electrolytes before use.

EXAMPLE I

A solution of dipotassium copper(I) tricyanide, $K_2Cu(CN)_3$, is prepared by dissolving in about 400 ml of triply-distilled water an amount of the purest potassium cyanide, prepared as required by procedures described hereinbefore, corresponding to 130 grams of KCN. Into this solution is stirred an amount of the copper(I) cyanide which corresponds to 89.5 grams of CuCN, purified if necessary, by procedures described hereinbefore, and then the volume of the mixture is brought to a total of about 800 ml with triply-distilled water. After stirring or in other ways agitating the mixture for about 8 hours and in such a way as to limit free access of atmospheric oxygen, 100 grams of pure sodium tetraborate decahydrate, $Na_2B_4O_7 \cdot 10H_2O$, are added and the mixture stirred, and even warmed if necessary, until the borate is completely dissolved.

In the event that sodium tetraborate decahydrate can not be obtained free of organic matter, boric anhydride, $B_2O_3$, initially fused at 500°C in a stream of oxygen, may be dissolved in the appropriate amount of a pure solution of potassium hydroxide, and requisite amounts of the resulting solution of sodium or potassium borate may be then added to the electrolyte.

Sodium or potassium hydroxide free of the organic matter which adversely affects electrolyte performance may be prepared by treating scrupulously clean alkali metal with very pure, de-oxygenated, aldehyde-free alcohol, hydrolyzing the alcoholate with triply-distilled water, and boiling off the alcohol; all operations must, of course, be performed with scrupulously clean apparatus, preferably of resistant stainless steel, and in an environment free of oxygen, dust, and acidic components.

The dipotassium copper(I) tricyanide electrolyte solution is then filtered through ignited asbestos into a vessel marked to indicate a volume of 1,000 ml; the filtrate is brought nearly to a volume 1,000 ml with triply-distilled water. It is preferably, however, to remove suspended material by centrifugation.

The solution of dipotassium copper(I) tricyanide is then analyzed for its free cyanide content as follows: Exactly twenty milliliters of said solution are transferred to a 250-ml Erlenmeyer flask and diluted to about 100 ml with water. After addition of 5 grams of potassium iodide, KI, and 5 ml of a concentrated solution of aqueous ammonia, $NH_4OH$, the mixture is slowly titrated with an 0.05 N solution of silver nitrate, $AgNO_3$, to a turbidimetric endpoint; each milliliter of 0.05 N silver nitrate is equivalent to 0.006511 gram of free potassium cyanide, KCN. The free potassium cyanide content of the solution of dipotassium copper(I) tricyanide is adjusted to a value slightly less than 0.09 molar, but it is emphasized that other values may be preferred as determined from the performance of electrolytic cells of particular design when loaded with the electrolyte and operated under prescribed conditions; the adjustment of the free potassium cyanide is accomplished by dissolution of small amounts of potassium cyanide or copper(I) cyanide or by addition of a solution of potassium cyanocuprate(I), $KCu(CN)_2$. The composition of the active complex in the electrolyte is thus described essentially by the formula 2.09 KCN·CuCN. Finally, the pH of the electrolyte is adjusted to a value of about 9.5 by careful additions of dilute sulfuric acid or potassium hydroxide solution; the borate buffer will permit only minor changes in the vicinity of pH 9.5.

All subsequent operations with the electrolyte must be performed in an absolutely oxygen-free environment, and all surfaces which come into contact with the electrolyte must be free of grease, dust, fingerprints, and extractable organic matter. Nitrogen and other inert gases or vapors may be conveniently stripped of oxygen and humidified by passage through water and then through at least two wash bottles containing a red, oxygen-absorbing solution prepared by dissolving 20 grams of potassium hydroxide, 2 grams of sodium anthraquinone betasulfonate, and 15 grams of sodium hydrosulfite ($Na_2S_2O_4$) in 100 ml of water, then through a wash bottle containing a saturated solution of lead acetate, and finally through water. The solution containing sodium hydrosulfite must be replaced when it loses its red color. Other methods for removing small amounts of oxygen from inert gases may also be used, but none are as convenient as the one described above.

A stream of oxygen-free nitrogen or inert gas, prepared as described above is passed through the cyanide-containing electrolyte for about 24 hours to remove dissolved oxygen; the entire operation is preferably performed in the oxygen-free atmosphere existing in an appropriately operated "glove-box" supplied with an inert gas rendered free of oxygen as described hereinbefore.

The quality of the deoxygenated electrolyte is preferably checked while it is still in the glove-box and each time prior to use. As a rule, the procedure for checking the electrolyte involves the determination of its decomposition potential and the detailed inspection of its plating-deplating characteristics as exhibited by plots of time versus potential drop across an electrolytic cell containing it when operated at constant current. High-quality electrolytes pass only a few nanoamperes when 0.6 volt is impressed across 0.5-square centimeter electrodes of smooth platinum spaced 2–3 mm apart; these low current flows are also obtained when copper is on the surface of the platinum cathode, and the high resistance to flow of electric current is an excellent criterion for demonstrating the superiority of electrolytes prepared in accordance with this invention over state-of-the-art electrolytes prepared by methods prior to the present disclosure.

The following example illustrates a preferred embodiment of the present invention; the electrolyte is deoxygenated and maintained oxygen-free by use of an alkali metal sulfite.

EXAMPLE II

An electrolyte of dipotassium copper(I) tricyanide, $K_2Cu(CN)_3$, is prepared as described in Example I, but it is not deoxygenated as described therein. The electrolyte prepared in this way consists of an aqueous solution of the approximate composition 2.09 KCN·CuCN containing sodium tetraborate and adjusted to a pH of about 9.5.

The electrolyte is transferred to a glove-box of the type indicated in Example I; there is no need to supply it with an absolutely oxygen-free gas, and usually commercial nitrogen gas can be used because it contains less than 0.5 per cent oxygen. About 50 grams of pure sodium sulfite, $Na_2SO_3$, are dissolved in one liter of the electrolyte, and the pH of the resulting solution adjusted, if necessary, to a value in the vicinity of 9.5, but preferably a little higher. Then, the electrolyte is transferred to a container which can be closed tightly. At any time, thereafter, if the electrolyte has not been unduly exposed to the atmosphere or oxygen-containing gases, it is ready to be transferred to electrolytic cells.

The loading of electrolytic cells with the electrolyte prepared as described above can be accomplished in room air if the electrolyte is not exposed to oxygen unduly, for there is sufficient sulfite to remove small amounts of oxygen which come into contact with it. Nevertheless, it is recommended that the loading of electrolytic cells take place under conditions which restrict free access of room air to the electrolyte, and it is best to load the electrolyte in an atmosphere substantially free of oxygen to ensure that the oxygen-scavenging capacity of the electrolyte is not over-taxed.

Other alkali metal or alkaline earth sulfites may be used in place of sodium sulfite, for it is the sulfite anion which scavenges dissolved oxygen; acid sulfites, or bisulfites, for example, sodium bisulfite, $NaHSO_3$, may be used, but the acidic hydrogen will require an equivalent of alkali for its neutralization and, thus, the pH of the electrolyte will possibly be lowered to the point of precipitation if these acidic sulfites are used in large amounts. In any event, once acidic sulfites are added to an alkaline electrolyte, the active anion is $SO_3^{-2}$.

It is often impossible to obtain alkali metal or alkaline earth sulfites of sufficient purity for use in the electrolytes to which this disclosure relates. In this event, pure alkali hydroxide solution, prepared if necessary by the procedures indicated in Example I, is treated with the requisite amount of gaseous sulfur dioxide, and the resulting sulfite solution is used in place of solid sulfites. Alkaline earth sulfites may be used interchangeably with alkali metal sulfites, but they often do not have sufficient solubility in the electrolyte.

EXAMPLE III

A solution of dipotassium cadmium(II) tetracyanide, $K_2Cd(CN)_4$, often named potassium cyanocadmate, is prepared by agitating 130 grams of pure, fused cadmium(II) oxide, CdO, that has been ignited in air at 600°C as described hereinbefore, in a solution of 350 ml of triply-distilled water containing the amount of pure potassium cyanide that corresponds to 260 grams of pure KCN, purified as indicated hereinbefore, if necessary; the mixture may need to be stirred for several days to dissolve all but a small amount of the cadmium oxide, and it is preferable to protect the agitated mixture from unrestricted access of air. The resulting solution, usually containing undissolved matter, is diluted to about 500 ml, and then 100 grams of pure sodium tetraborate decahydrate, $Na_2B_4O_7 \cdot 10H_2O$, prepared as indicated hereinbefore, are added and the mixture stirred. If pure tetraborate is not available, boron trioxide may be substituted as indicated in Example I. Alternatively, sodium tetraborate is not added if an unbuffered electrolyte is preferred.

The pH of the mixture, measured electrometrically with a glass electrode, is slowly brought to a value between 9 and 11 by cautious additions of a cold solution of about 100 grams of pure sulfuric acid in 200 ml of pure water; the additions of acid are controlled so as to prevent the temperature of the cyanide solution from rising over 35°C; the final adjustments of the pH are made when the solution is at about 25°C, and it may be necessary to be cognizant of the alkali metal ion concentration in the solution to make corrections on pH-meter readings when using electrodes that are influenced by alkali metal ion concentrations, as is evident to those versed in the art. Finally, the solution is cooled, and decanted, or filtered through ignited asbestos if deemed necessary, but it is preferably centrifuged, and then made up to a volume of about 900 ml.

Then, 50 grams of sodium sulfite, $Na_2SO_3$, are stirred into the solution until dissolved, or a requisite amount of a sodium sulfite solution prepared as indicated priorly is added, and the entire solution is brought to a volume of one liter. The pH of this electrolyte is adjusted by careful additions of a solution of potassium hydroxide or sulfuric acid.

The neutralization of the potassium hydroxide formed by reaction of potassium cyanide with cadmium oxide introduces potassium sulfate; the greater portion of this salt is removed by filtering the cold electrolyte.

While the invention has been described with particularity in reference to specific embodiments thereof, it is to be clearly understood that the present disclosure of the specific embodiments has been made only by way of example, and that numerous changes in manipulative details, sequence of actions, and in the combination of reagents and starting materials may be resorted to without departing from the spirit and the scope of the invention as hereinafter claimed.

What is claimed is:

1. An alkaline electrolyte solution for use in electrolytic cells which provide accurate and reproducible coulombic storage and transfer functions, said electrolyte solution being free of dissolved oxygen and containing a plurality of discrete ionic species, said ionic species including the complex cyanide ions of only one reversibly electrodepositable and electrosoluble metal, and said complex cyanide ions in solution being defined in total by the formula:

$$X[A(CN)_n] \cdot Z[Me(CN)_y]$$

wherein X is the number of moles of a cyanide, $A(CN)_n$, of an alkali metal or alkaline earth cation A which has a valence, $n$, Z is the number of moles of a cyanide, $Me(CN)_y$, in which Me is the cation of said reversibly electrodepositable and electrosoluble metal of valency y which forms complex ions, and Z ranges from 0.05 to 3.0 gram-mole per liter, and the ratio of X to Z ranges from 1.5 to 1 up to, and including, 3.0 to 1.

2. The alkaline electrolyte solution of claim 1, free of dissolved oxygen, wherein said soluble complex cyanides in total correspond to the composition:

$$X[A(CN)_n] \cdot Z[Me(CN)_y]$$

and Me is the univalent cation of one of a group of metals which includes copper and silver in a periodic systematic classification of elements, said metal being reversibly electrodepositable and electrosoluble in electrolyte solutions containing cyanides; the ratio of X to Z ranges from 2.07 to 2.11 to 1, and Z ranges from 0.8 to 1.2 gram-mole per liter.

3. An alkaline electrolyte solution for use in electrolytic cells which provide accurate and reproducible coulombic storage and transfer functions, said electrolyte containing a plurality of discrete ionic species, said ionic species including the complex cyanide ions of only one reversibly electrodepositable and electrosoluble metal, and said complex cyanide ions in solution being defined in total by the formula:

$$X[A(CN)_n] \cdot Z[Me(CN)_y]$$

wherein X is the number of moles of a cyanide, $A(CN)_n$, of an alkali metal or alkaline earth cation A which has a valence, $n$, Z is the number of moles of a cyanide, $Me(CN)_y$, in which Me is the cation of said reversibly electrodepositable and electrosoluble metal of valency y which forms complex ions, and Z ranges from 0.05 to 3.0 gram-mole per liter, and the ratio of X to Z ranges from 1.5 to 1 up to, and including, 3.0 to 1, said alkaline electrolyte solution further containing:
a. a concentration of sulfite ion, $SO_3^{-2}$, of 0.05 to 1.0 gram-ion per liter of electrolyte;
b. a concentration of orthoborate ion equivalent to 0.05 to 1.0 gram-mole of $B_2O_3$ per liter of electrolyte; and
c. an effective or active hydrogen ion concentration of $10^{-8}$ to $10^{-13}$ gram-ion per liter, corresponding to an electrometrically determined pH of 8 to 13.

4. The electrolyte of claim 3 containing from 0.4 to 0.5 gram-mole per liter of sodium sulfite, $Na_2SO_3$, and 0.25 gram-mole per liter of sodium tetraborate decahydrate, $Na_2B_4O_7 \cdot 10\ H_2O$ and an hydrogen ion concentration corresponding to a pH of 9.4 to 9.6, wherein the complex cyanides in the electrolyte correspond in total to the composition:

$$X[A(CN)_n] \cdot Z[Me(CN)_y]$$

and Me is the univalent cation of one of a group of metals which includes copper and silver in a periodic systematic classification of elements, said metal being reversibly electrodepositable and electrosoluble in electrolyte solutions containing cyanides, A is an alkali metal, $n=1$, $y=1$, the ratio of X to Z is from 2.07 to 2.11 to 1, and Z is 0.8 to 1.2 gram-mole per liter.

5. The electrolyte of claim 1 which further includes sulfite ion, $SO_3^{-2}$, in concentrations of 0.5 to 1.0 gram-ion per liter of electrolyte as a scavenger of dissolved oxygen.

6. The electrolyte of claim 1 which further includes dissolved sodium sulfite, $Na_2SO_3$, in concentrations of 0.05 to 1.0 gram-mole per liter of electrolyte as a scavenger of dissolved oxygen.

7. The electrolyte of claim 1 which further includes orthoborate ion in solution in concentrations equivalent to 0.05 to 1.0 gram-mole of $B_2O_3$ per liter of electrolyte.

8. The electrolyte of claim 1 which further includes dissolved sodium tetraborate, $Na_2B_4O_7$, in concentrations equivalent to 0.05 to 1.0 gram-mole of $B_2O_3$ per liter of electrolyte.

* * * * *